United States Patent
Jang et al.

(10) Patent No.: US 8,412,198 B2
(45) Date of Patent: Apr. 2, 2013

(54) METHOD AND SYSTEM FOR CONFIGURING IP ADDRESS IN A WIRELESS COMMUNICATION SYSTEM

(75) Inventors: Hee-Jin Jang, Yongin-si (KR); Jae-Hoon Kim, Seoul (KR); Youn-Hee Han, Guri-si (KR); Jong-Ho Bang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 451 days.

(21) Appl. No.: 11/520,784

(22) Filed: Sep. 14, 2006

(65) Prior Publication Data

US 2007/0064653 A1 Mar. 22, 2007

(30) Foreign Application Priority Data

Sep. 14, 2005 (KR) ........................ 10-2005-0085849

(51) Int. Cl.
*H04W 36/00* (2009.01)
(52) U.S. Cl. ............... 455/436; 455/422.1; 455/524; 455/525; 370/331; 370/389
(58) Field of Classification Search .......... 370/341, 370/349, 912, 913, 310, 345, 328–338, 395.2–408, 370/59; 455/432.1, 433–445, 33.1, 33.4, 455/422.1
See application file for complete search history.

(56) References Cited

U.S. PATENT DOCUMENTS

| | | | |
|---|---|---|---|
| 2001/0047484 A1* | 11/2001 | Medvinsky et al. | 713/201 |
| 2002/0069278 A1* | 6/2002 | Forslow | 709/225 |
| 2002/0091636 A1* | 7/2002 | Carroll Bullard | 705/40 |
| 2002/0097718 A1* | 7/2002 | Korus et al. | 370/390 |
| 2002/0118656 A1* | 8/2002 | Agrawal et al. | 370/329 |
| 2002/0191558 A1* | 12/2002 | Agrawal et al. | 370/329 |
| 2002/0191562 A1* | 12/2002 | Kumaki et al. | 370/331 |
| 2003/0007475 A1* | 1/2003 | Tsuda et al. | 370/338 |
| 2003/0043781 A1* | 3/2003 | Proctor et al. | 370/352 |
| 2003/0069947 A1* | 4/2003 | Lipinski | 709/220 |
| 2003/0142642 A1* | 7/2003 | Agrawal et al. | 370/328 |
| 2003/0185186 A1* | 10/2003 | Tsutsumi et al. | 370/338 |
| 2003/0227937 A1* | 12/2003 | Abrol et al. | 370/457 |
| 2004/0114566 A1* | 6/2004 | Lim et al. | 370/349 |
| 2005/0192011 A1* | 9/2005 | Hong et al. | 455/440 |
| 2005/0272481 A1* | 12/2005 | Kim | 455/574 |
| 2005/0277417 A1* | 12/2005 | Yoon et al. | 455/436 |
| 2005/0281288 A1* | 12/2005 | Banerjee et al. | 370/477 |
| 2006/0245373 A1* | 11/2006 | Bajic | 370/254 |

FOREIGN PATENT DOCUMENTS

| JP | 09-330284 | 12/1997 |
|---|---|---|
| KR | 20040076509 | 9/2004 |

OTHER PUBLICATIONS

R. Hinden et al., "Internet Protocol Version 6 (IPv6) Addressing Architecture", Network Working Group, RFC 3513, Apr. 2003, pp. 1-26, The Internet Society.

\* cited by examiner

*Primary Examiner* — Chuong A Ngo
(74) *Attorney, Agent, or Firm* — NSIP Law

(57) ABSTRACT

An apparatus and method for providing a seamless communication service in a wireless communication system. The method includes transmitting a first message to a base station when an IP subnet has been changed due to movement of the portable terminal, the first message including a Medium Access Control (MAC) address of the portable terminal, receiving IP address information from the base station, which can be used in a new IP subnet, and configuring a new IP address based on the received IP address information.

21 Claims, 6 Drawing Sheets

ICMPv6 Message Format

Ex) Type=111
　　Code = 1 (Address request)
　　Code = 2 (Address response)

METHOD AND SYSTEM FOR CONFIGURING IP ADDRESS IN A WIRELESS COMMUNICATION SYSTEM

CROSS-REFERENCE TO RELATED APPLICATION

This application claims the benefit under 35 U.S.C. §119 (a) of Korean Patent Application No. 10-2005-0085849, entitled "Method And System For Configuring IP Address In A Wireless Communication System", filed in the Korean Industrial Property Office on Sep. 14, 2005, the entire disclosure of which is hereby incorporated by reference.

BACKGROUND OF THE INVENTION

1. Field of the Invention

The present invention relates to a wireless communication system. More particularly, the present invention relates to a method and a system for configuring an Internet Protocol (IP) address in a wireless communication system.

2. Description of the Related Art

In the 4$^{th}$ Generation (4G) communication system, which is the next communication system, active research is being carried out in order to provide users with various Quality of Services (QoSs) having a transmission speed of about 100 Mbps. A representative of the 4G communication systems is the Institute of Electrical and Electronics Engineers (IEEE) 802.16 communication system.

Meanwhile, a mobile Internet service, that is, the Wireless Broadband (WiBro) communication system, has a standard which is compatible with the IEEE 802.16 communication system standard. The WiBro communication system provides a high speed data service through various types of Portable Subscriber Stations (PSSs) in an indoor or outdoor stationary environment or in a mobile environment of walking speed or middle/low speed (about 60 km/h). The WiBro communication system is currently implemented in connection with the Internet Protocol version 6 (IPv6), which is the next generation address system.

Hereinafter, a network structure of a typical WiBro communication system will be described with reference to FIG. 1.

FIG. 1 illustrates a network structure of a typical WiBro communication system.

Referring to FIG. 1, the WiBro communication system includes a PSS 100 corresponding to mobile stations of the IEEE 82.16 communication system, a plurality of Radio Access Stations (RASs) 110, 120, 130, and 140 corresponding to base stations of the IEEE 82.16 communication system, Access Control Routers (ACRs) 150 and 160 corresponding to base station controllers of the IEEE 82.16 communication system, an Authentication Authorization Accounting (AAA) server 170, and a Home Agent (HA) 180.

The RAS is an element which is located at a terminal of a wire network and performs transmission/reception with the PSS through a wireless interface. The RAS supports the mobility of the PSS and manages and controls wireless resources. The ACR manages Medium Access Control (MAC) addresses, connection identifier and IP addresses of the PSSs in a lower network stage, controls the PSSs and RASs, performs IP packet routing and authentication/security tasks, and provides QoS to the PSS. The AAA 170 performs authentication, authorization, and accounting for the PSS. The HA 180 stores address information of the PSS.

When the PSS 100 moves to a new RAS of ACR #2 160 which has an IP subnet different from that of RAS #1 110 of ACR #1 150 to which the PSS 100 currently belongs, the PSS 100 must perform a network reentry process. Hereinafter, the network reentry process will be described with reference to FIG. 2.

FIG. 2 is a signal flowchart illustrating a network reentry process between a PSS and an RAS in a typical IEEE 802.16/WiBro communication system.

Referring to FIG. 2, according to movement of the PSS 200 to a new RAS 250, the PSS 200 receives a preamble of a downlink frame transmitted from the RAS 250 and acquires a system synchronization with the RAS 250. Thereafter, the PSS 200 receives base station information broadcast by the RAS 250, that is, base station information included in a Downlink Channel Descriptor (DCD) message, an Uplink Channel Descriptor (UCD) message, a Downlink MAP (DL-MAP) message, and an Uplink MAP (UL-MAP) message, thereby acquiring a downlink synchronization.

Then, the PSS 200 transmits a ranging request (RNG_REQ) message to the RAS 250 at step 202, and receives a ranging response (RNG_RSP) message, which is a response to the RNG_REQ, from the RAS 250, thereby acquiring an uplink synchronization with the RAS 250 at step 204.

After completing the ranging process, the PSS 200 transmits a subscriber station basic capability request (SBC_REQ) message to the RAS 250 as step 206, and receives a subscriber station basic capability response (SBC_RSP) message from the RAS 250 at step 208, thereby completing a basic capability negotiation process.

After completing the basic capability negotiation process, the PSS 200 transmits a Privacy Key Management (PKM) request (PKM_REQ) message to the RAS 250 at step 210, and receives a PKM response (PKM_RSP) message from the RAS 250 at step 212, thereby completing an authentication process.

After completing the authentication process, the PSS 200 transmits a registration request (REG_REQ) message to the RAS 250 at step 214, and receives a registration response (REG_RSP) message from the RAS 250 at step 216, thereby completing the registration in the RAS 250. Steps 202 to 216 correspond to the network reentry process performed in layer 2, in which it takes a long time to complete the ranging, basic capability negotiation, authentication, and registration.

After completing the process up to step 216, the PSS 200 must perform an IP address auto-configuration process for IP connection at step 218. According to the IP address auto-configuration, an IP address of a total of 128 bits is configured through a combination of a 64 bit prefix of an AR, which is included in a Routing Advertisement (RA) message periodically received by the PSS 200 from the RAS 250, and an interface identifier (ID) of a mobile node with 64 bits, that is, a 64 bit MAC address. After completing the IP address auto-configuration, the PSS 200 performs Duplicate Address Detection (DAD) in order to determine if the 128 bit IP address is being used by another PSS in the same subnet. As a result of the DAD process, when the auto-configured IP address is not yet occupied, the PSS 200 performs signal transmission/reception by using the auto-configured IP address.

As described above, when the PSS changes the subnet through movement, the PSS must sequentially perform a layer 2 network reentry process, an IP address auto-configuration process, and a DAD process. Therefore, the PSS cannot avoid interruption of communication until the network reentry process and the DAD process are completed. This problem undermines the object of the IEEE 802.16/WiBro communication system, which is to provide a seamless communication service.

Accordingly, a need exists for a system and method for reducing interruption of communication during a network entry process.

SUMMARY OF THE INVENTION

Accordingly, exemplary embodiments of the present invention have been made to address the above-mentioned problems occurring in the prior art, and an object of exemplary embodiments of the present invention is to provide an apparatus and method for providing a seamless communication service in a wireless communication system.

In order to accomplish this object, a method is provided for configuring an Internet Protocol (IP) address during a network entry process by a portable terminal in a wireless communication system, the method comprising the steps of transmitting a first message to a base station when an IP subnet has been changed due to movement of the portable terminal, the first message comprising a Medium Access Control (MAC) address of the portable terminal, receiving IP address information from the base station, which can be used in a new IP subnet, and configuring a new IP address based on the received IP address information.

In accordance with another aspect of exemplary embodiments of the present invention, a method is provided for allocating an Internet Protocol (IP) address during a network entry process by a base station in a wireless communication system, the method comprising the steps of receiving a ranging request message from a portable terminal, the ranging request message comprising a Medium Access Control (MAC) address of the portable terminal, determining with reference to the MAC address if the portable terminal has moved from another IP subnet, requesting a base station controller to send IP address information for use by the portable terminal when the portable terminal has moved from another IP subnet, receiving the IP address information from the base station controller, and transmitting the LP address information to the portable terminal.

In accordance with another aspect of exemplary embodiments of the present invention, a method is provided for allocating an Internet Protocol (IP) address during a network entry process by a base station controller in a wireless communication system, the method comprising the steps of receiving an IP address information request message from a base station, the IP address information request message comprising a Medium Access Control (MAC) address of a portable terminal, determining an IP address for use by the portable terminal through a combination of the MAC address and a network prefix, and transmitting determined IP address information to the base station.

In accordance with another aspect of exemplary embodiments of the present invention, a wireless communication system is provided for configuring an Internet Protocol (IP) address during a network entry process, the wireless communication system comprising a portable terminal, wherein the portable terminal transmits a first message to a base station when an IP subnet has been changed due to movement of the portable terminal, the first message comprising a Medium Access Control (MAC) address of the portable terminal, receives IP address information from the base station, which can be used in a new IP subnet, and configures a new IP address based on the received IP address information.

In accordance with another aspect of exemplary embodiments of the present invention, a wireless communication system is provided for configuring an Internet Protocol (IP) address during a network entry process, the wireless communication system comprising a base station for receiving a ranging request message from a portable terminal, the ranging request message comprising a Medium Access Control (MAC) address of the portable terminal, determining with reference to the MAC address if the portable terminal has moved from another IP subnet, requesting a base station controller to send IP address information for use by the portable terminal when the portable terminal has moved from another IP subnet, receiving the IP address information from the base station controller, and transmitting the IP address information to the portable terminal. The wireless communication system further comprises a base station controller for receiving an IP address information request message from a base station, the IP address information request message comprising a Medium Access Control (MAC) address of a portable terminal, determining an IP address for use by the portable terminal through a combination of the MAC address and a network prefix, and transmitting determined IP address information to the base station.

BRIEF DESCRIPTION OF THE DRAWINGS

The above and other objects, features and advantages of exemplary embodiments of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

Hereinafter, exemplary embodiments of the present invention will be described with reference to the accompanying drawings. In the following description, a detailed description of known functions and configurations incorporated herein will be omitted for clarity and conciseness.

Exemplary embodiments of the present invention provide a system and method for allocating an IP address during a network entry process in a wireless communication system to which the Internet Protocol version 6 (IPv6) is applied, for example, an IEEE 802.16 communication system and a WiBro communication system. Specifically, exemplary embodiments of the present invention provide for new messages exchanged between a Radio Access Station (RAS) and an Access Control Router (ACR), so that the RAS or ACR can more rapidly allocate an IP address by using the new messages when the subnet of a Portable Subscriber Station (PSS) is changed due to movement of the PSS.

Figure 3:
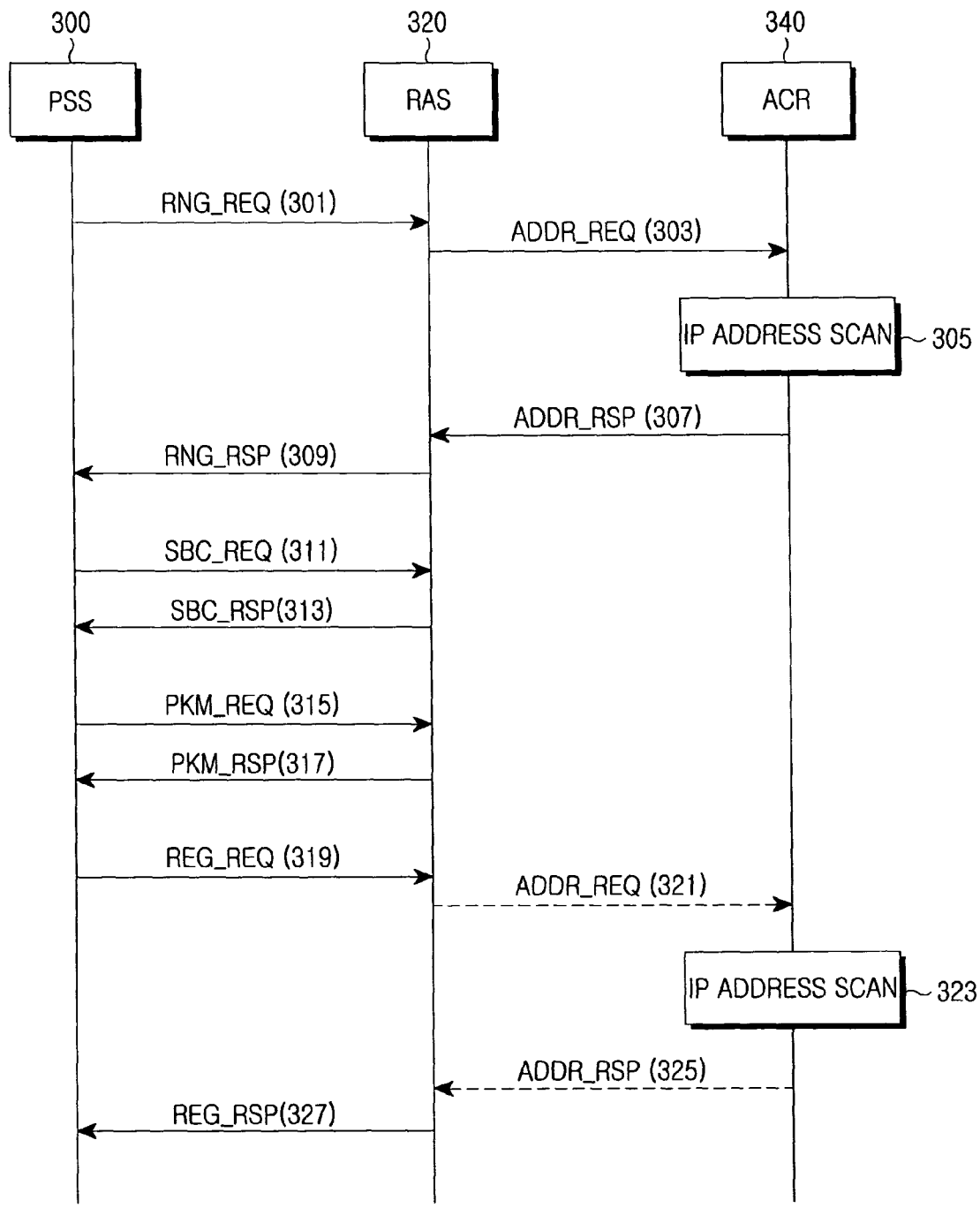
FIG. 3 is a signal flowchart of a network reentry process between a PSS and an RAS in a wireless communication system according to an exemplary embodiment of the present invention.

FIG. 3 is a signal flowchart of a network reentry process between a PSS and an RAS in a wireless communication system according to an exemplary embodiment of the present invention.

Referring to FIG. 3, according to movement of the PSS 300 to a new RAS 320, the PSS 300 receives a preamble of a downlink frame transmitted from the RAS 320 and acquires a system synchronization with the RAS 320. Thereafter, the PSS 300 receives base station information broadcast by the RAS 320, that is, base station information included in a Downlink Channel Descriptor (DCD) message, an Uplink Channel Descriptor (UCD) message, a Downlink MAP (DL-MAP) message, and an Uplink MAP (UL-MAP) message, thereby acquiring a downlink synchronization.

Figure 6:
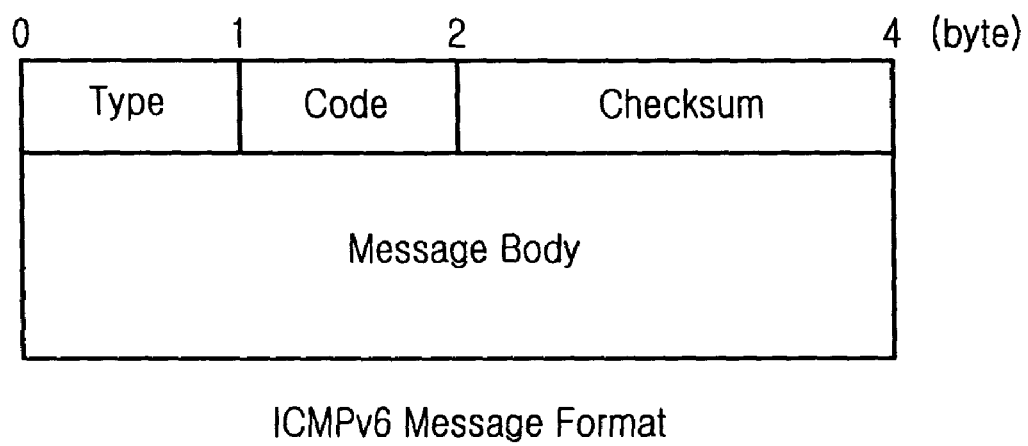
FIG. 6 illustrates the format of an ICMP message according to an exemplary embodiment of the present invention.

Then, the PSS 300 transmits a ranging request (RNG_REQ) message to the RAS 320 at step 301. The RAS 320 having received the RNG_REQ message determines if the subnet of the PSS 300 has been changed, due to the movement of the PSS 300 to the RAS 320, by using a Medium Access Control (MAC) address of the PSS 300 included in the RNG_REQ message. When the subnet of the PSS 300 has been changed due to the movement of the PSS 300 to the RAS 320, the RAS 320 transmits an Address Request (ADDR_REQ) message, which is newly provided by exemplary embodiments of the present invention, to the ACR 340 at step 303. The ADDR_REQ message may comprise, for example, an Internet Control Message Protocol (ICMP) message, the format of which is shown in FIG. 6, but is not limited thereto. In yet other exemplary embodiments of the present invention, another type of message instead of the ICMP message can be used.

After receiving the ADDR_REQ message, the ACR 340 scans IP addresses which can be allocated to the PSS 300 as step 305. Specifically, the ACR 340 can search for an IP address of a total of 128 bits which is obtained through a combination of a 64 bit MAC address of the PSS 300 and a 64 bit prefix of the network. If the MAC address is being used by at least one PSS other than the PSS 300, the ACR 340 can search for the 128 bit IP address by using a MAC address which is not being used in the current network.

The ACR 340 inserts a detected IP address into an Address Response (ADDR_RSP) message which is newly provided by exemplary embodiments of the present invention, and transmits the ADDR_RSP message to the RAS 320 at step 307. The ADDR_RSP message may comprise, for example, an ICMP message, the format of which is shown in FIG. 6, but is not limited thereto.

The RAS 320 recognizes the IP address included in the ADDR_RSP message, inserts the IP address into a ranging response (RNG_RSP) message, and transmits the RNG_RSP message to the PSS 300 at step 309. At this time, the RAS 320 may insert the IP address into a registration response (REG_RSP) message instead of the RNG_RSP message, and may transmit the REG_RSP message to the PSS 300.

Figure 1:
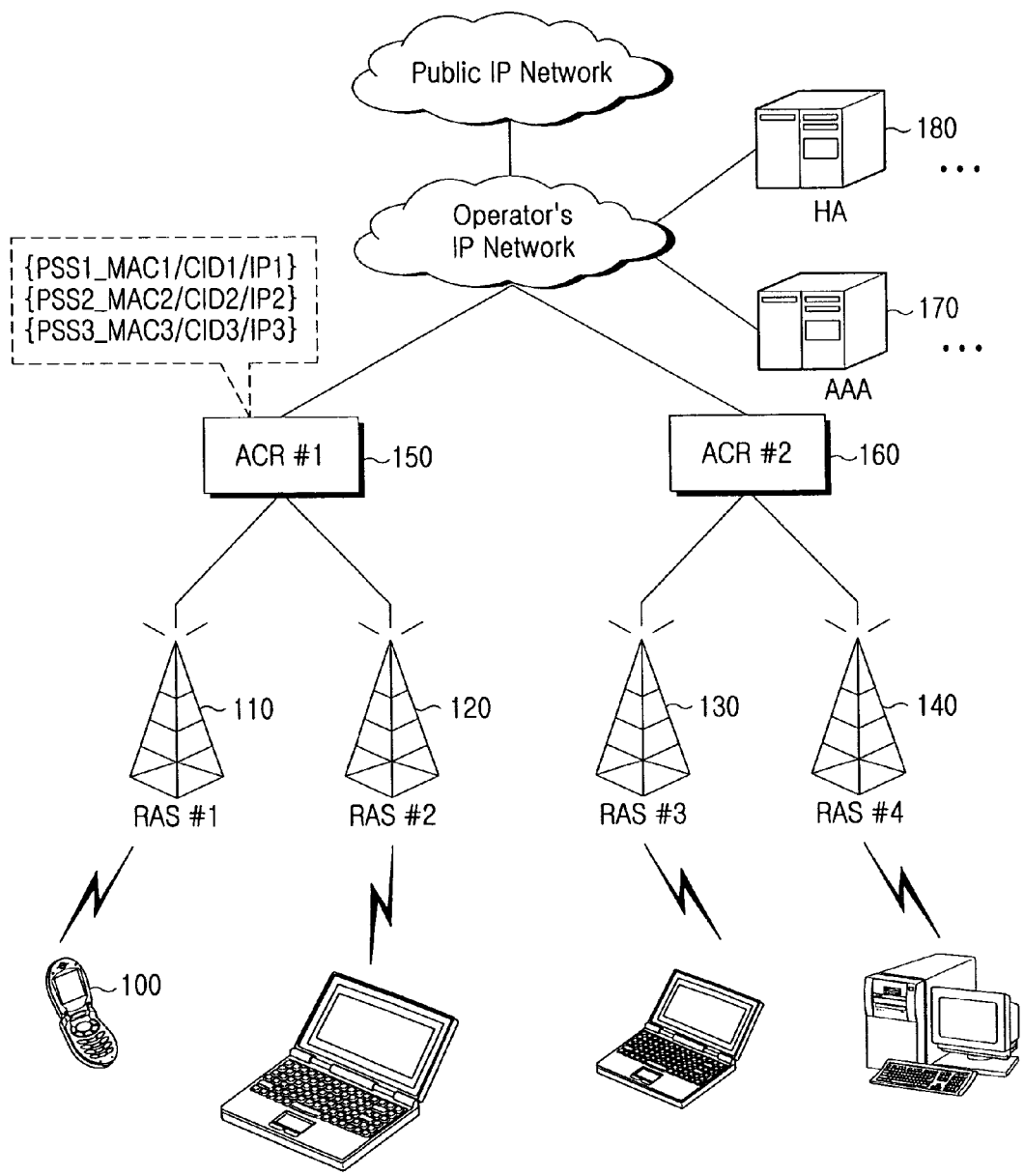
FIG. 1 illustrates a network structure of a typical WiBro communication system.
Figure 2:
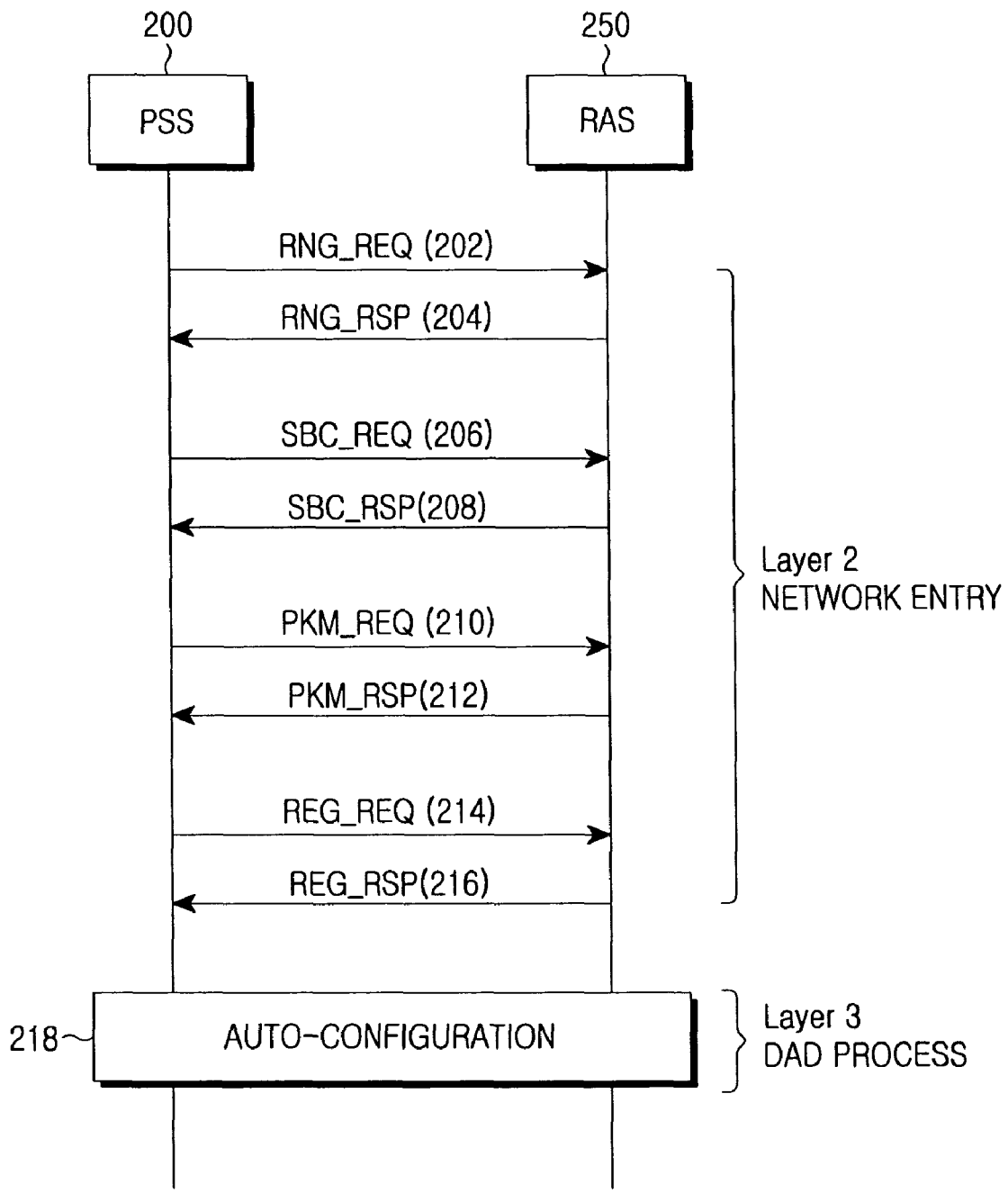
FIG. 2 is a signal flowchart illustrating a network reentry process between a PSS and an RAS in a typical IEEE 802.16/WiBro communication system.

After receiving the RNG_RSP message, the PSS 300 can recognize the IP address and perform an IP address autoconfiguration. Thereafter, the PSS 300 performs a basic capability negotiation process at steps 311 and 313 by using a subscriber station basic capability request (SBC_REQ) message and a subscriber station basic capability response (SBC_RSP) message, and performs an authentication process at steps 315 and 317 by using a Privacy Key Management (PKM) request (PKM_REQ) message and a PKM response (PKM_RSP) message, in substantially the same way as in step 206 to 212 of FIG. 2.

When the RAS 320 has received a registration request (REG_REQ) message from the PSS 300 at step 319, the RAS 320 may transmit an ADDR_REQ message to the ACR 340 at step 321. Then, the ACR 340 performs steps 323 and 325 in substantially the same way as in steps 305 and 307. Then, the RAS 320 transmits the REG_RSP message to the RAS 320 at step 327. As described above, the transmitted REG_RSP message may carry the IP address inserted by the RAS 320.

As described above, the PSS according to exemplary embodiments of the present invention can perform the IP address configuration during the network entry process. Therefore, the PSS need not perform the Duplicate Address Detection (DAD) process and thus can reduce a communication interruption time as long as that necessary for the DAD process, thereby minimizing the communication interruption time.

Figure 4:
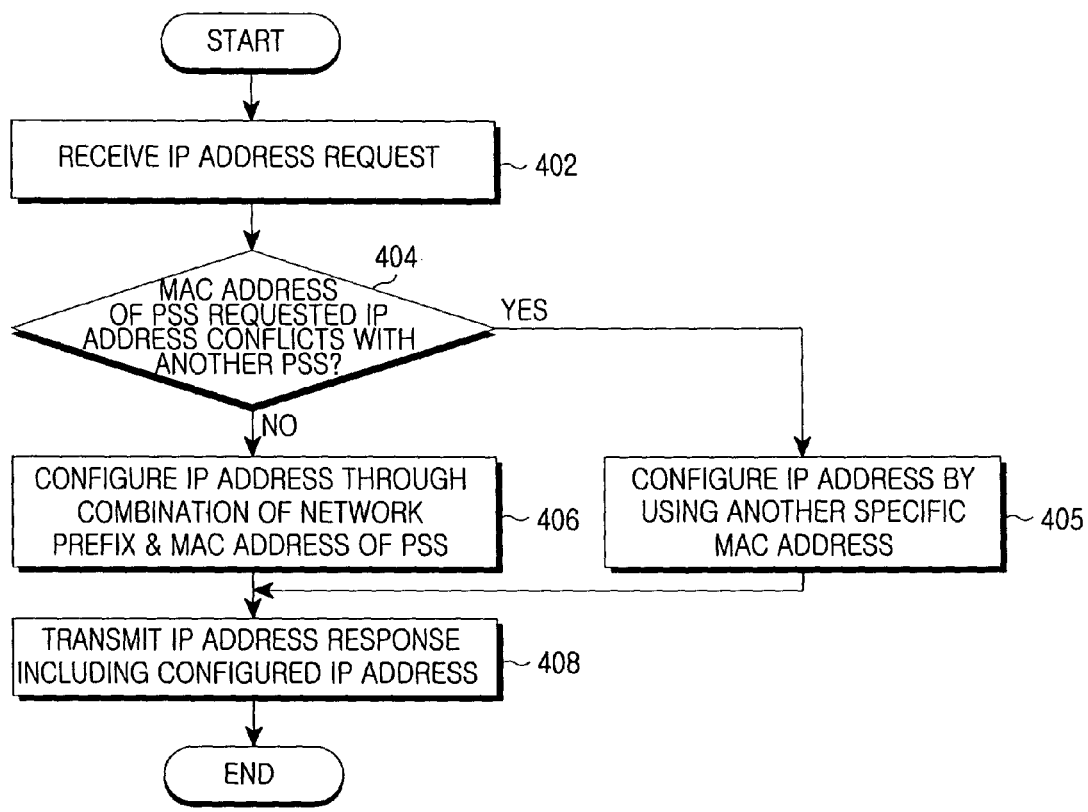
FIG. 4 is a flowchart of a process performed by the ACR in the network entry process in a wireless communication system according to an exemplary embodiment of the present invention.

FIG. 4 is a flowchart of a process performed by the ACR in the network entry process in a wireless communication system according to an exemplary embodiment of the present invention.

Referring to FIG. 4, the ACR receives the ADDR_REQ message for requesting an IP address of the PSS from the RAS in step 402. Then, in step 404, the ACR determines if a MAC address of the PSS conflicts with a MAC address of another PSS. As a result of the determination, the ACR proceeds to step 405 when the MAC address of the PSS conflicts with a MAC address of another PSS, and proceeds to step 406 when the MAC address of the PSS does not conflict with a MAC address of another PSS.

In step 405, the ACR configures a 128 bit IP address by using a MAC address which is not being used in the subnet, and then proceeds to step 408. In step 406, the ACR configures an IP address through a combination of a network prefix and a MAC address of the PSS requested the IP address, and then proceeds to step 408. In step 408, the ACR transmits an ADDR_RSP message including the configured IP address to the RAS.

Figure 5:
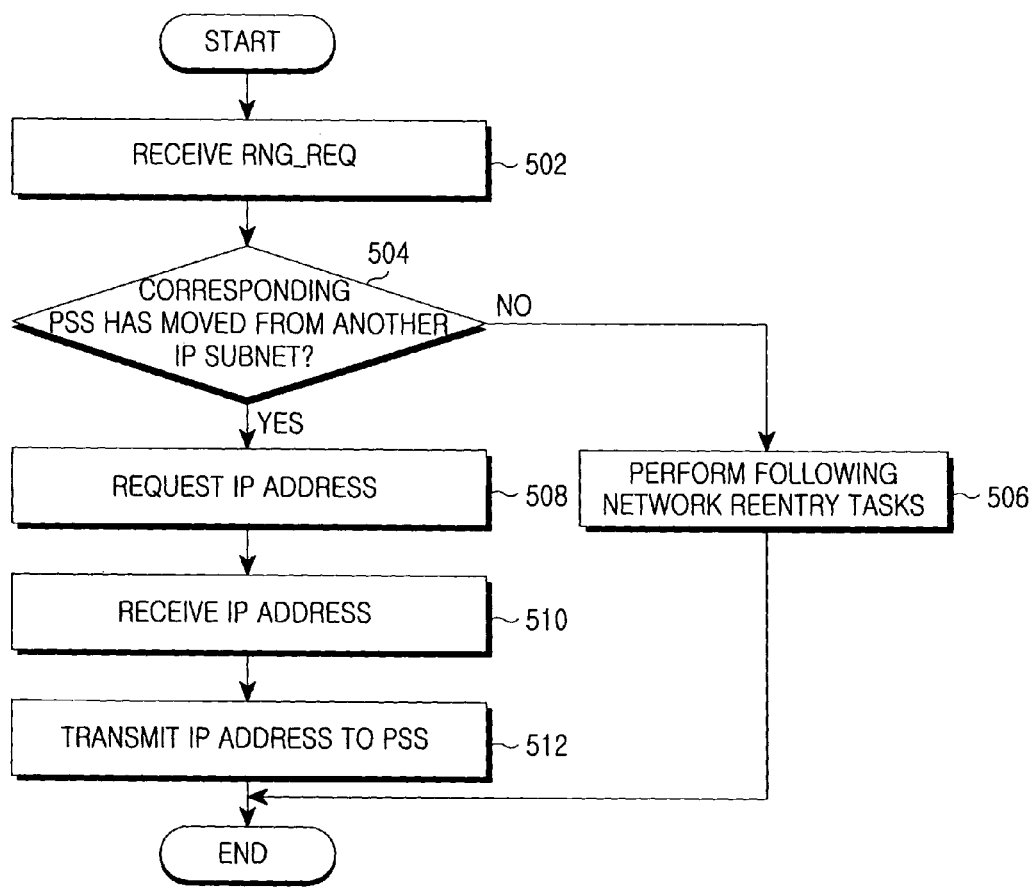
FIG. 5 is a flowchart of a process performed by the RAS in the network entry process in a wireless communication system according to an exemplary embodiment of the present invention.

FIG. 5 is a flowchart of a process performed by the RAS in the network entry process in a wireless communication system according to an exemplary embodiment of the present invention.

Referring to FIG. 5, the RAS receives the RNG_REQ message in step 502 and then proceeds to step 504. The transmitted RNG_REQ message includes the MAC address of the PSS. Then, in step 504, the RAS determines if the PSS has moved from another IP subnet. Then, the RAS proceeds to step 508 when the PSS has moved from another IP subnet and proceeds to step 506 when the PSS has not moved from another IP subnet.

In step 506, the RAS performs the ranging, basic capability negotiation, authentication, and registration with the PSS.

In step 508, the RAS requests the ACR to send an IP address for the PSS. Then, in step 510, the RAS receives an IP address from the ACR as a response to the request for the IP address. Then, in step 512, the RAS transmits the IP address information to the PSS.

FIG. 6 illustrates the format of an ICMP message according to an exemplary embodiment of the present invention.

The ICMP message shown in FIG. 6 is used for the ADDR_REQ message and the ADDR_RSP message. The ICMP message has a size totaling four bytes, and comprises one byte of type field, one byte of code field, two bytes of checksum field, and a message body. The message body may comprise a MAC address of the PSS or an IP address to be used by the PSS. For example, when the ICMP message is used as the ADDR_REQ message, the ACR, upon receiving an ICMP message having a code field recorded by a value of "1," recognizes that the RAS is requesting an IP address. In contrast, when the ICMP message is used as the ADDR_RSP message, the RAS, upon receiving an ICMP message having a code field recorded by a value of "2," recognizes that the ICMP message received by the RAS contains a response to the request for the IP address. When the ACR reports that the MAC address of the PSS is specific, the message body of the ADDR_RSP message is filled with "0" which contains no information. In the opposite case, the message body of the ADDR_RSP message is filled with a specific address which is not found in the system.

According to exemplary embodiments of the present invention as described above, a PSS is allocated a new IP address during a network entry process and need not perform a DAD process in a WiBro or IEEE 802.16 communication system. Therefore, exemplary embodiments of the present invention can reduce communication interruption time by a period as long as that caused by the DAD process, thereby minimizing the communication interruption time.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for configuring an Internet Protocol (IP) address during a network entry process by a portable terminal in a wireless communication system, the method comprising:
    transmitting a ranging request message to a base station when an IP subnet has been changed, the ranging request message comprising a Medium Access Control (MAC) address of the portable terminal;
    receiving a ranging response message comprising IP address information from the base station, usable in a new IP subnet; and
    configuring a new IP address from the received IP address information,
    wherein the MAC address is used for determining whether the portable terminal has moved from another IP subnet,
    wherein the new IP address is configured using a combination of the MAC address and a network prefix, if the MAC address does not conflict with a MAC address of another portable terminal,
    wherein the new IP address is configured using a specific MAC address which is not being used in the new IP subnet, if the MAC address conflicts with the MAC address of another portable terminal, and
    wherein the new IP address is used for a signal transmission and reception of the portable terminal.

2. The method as claimed in claim 1, further comprising transmitting a registration request message comprising the MAC address to the base station when the IP subnet has been changed; and
    receiving a registration response message from the base station, the registration response message comprising the IP address information usable in the new IP subnet.

3. The method as claimed in claim 1, wherein the IP subnet is changeable due to movement of the portable terminal.

4. A method for allocating an Internet Protocol (IP) address during a network entry process by a base station in a wireless communication system, the method comprising:
    receiving a ranging request message from a portable terminal, the ranging request message comprising a Medium Access Control (MAC) address of the portable terminal;
    determining if an IP subnet of the portable terminal is changed based on the MAC address;
    transmitting, to a base station controller, an address request message for requesting an IP address usable by the portable terminal in a changed IP subnet, if the IP subnet of the portable terminal is changed;
    receiving an address response message comprising information on the IP address from the base station controller; and
    transmitting a ranging response message comprising the information on the IP address to the portable terminal,
    wherein the IP address is configured using a combination of the MAC address and a network prefix, if the MAC address does not conflict with a MAC address of another portable terminal,
    wherein the IP address is configured using a specific MAC address which is not being used in the changed IP subnet, if the MAC address conflicts with the MAC address of another portable terminal, and
    wherein the IP address is used for a signal transmission and reception of the portable terminal.

5. The method as claimed in claim 4, wherein the address request message comprises an Internet Control Message Protocol (ICMP) message, a code value of the ICMP message being set to a code value corresponding to an IP address request.

6. The method as claimed in claim 4, wherein the address response message comprises an Internet Control Message Protocol (ICMP) message, a code value of the ICMP message being set to a code value corresponding to an IP address response.

7. The method as claimed in claim 4, further comprising in response to receiving a registration request message comprising the MAC address from the portable terminal, transmitting an address request message to the base station controller and receiving a registration response message comprising the IP address information transmitted to the portable terminal.

8. The method as claimed in claim 4, wherein the address request message and the address response message comprise a type field comprising type information of a corresponding message, a code field comprising information to indicate whether the corresponding message is a message for requesting the IP address usable by the portable terminal in the changed IP subnet, a checksum field comprising information to check for an error of the corresponding message, and a message field comprising the MAC address of the portable terminal, if the corresponding message is the address request message, and comprising the information on the IP address, if the corresponding message is the address response message.

9. A method for allocating an Internet Protocol (IP) address during a network entry process by a base station controller in a wireless communication system, the method comprising:
    receiving, from a base station, an address request message for requesting an IP address usable by a portable terminal in a new IP subnet;
    determining the IP address usable by the portable terminal using a combination of a Medium Access Control (MAC) address of the portable terminal and a network prefix, if the MAC address not conflict with a MAC address of another portable terminal; and
    transmitting an address response message comprising information on the determined IP address to the base station,
    wherein the determined IP address is used for a signal transmission and reception of the portable terminal, and
    wherein the IP address usable by the portable terminal is determined using a specific MAC address which is not being used in the new IP subnet, if the MAC address conflicts with the MAC address of another portable terminal.

10. The method as claimed in claim 9, wherein the address request message comprises an Internet Control Message Protocol (ICMP) message, a code value of the ICMP message being set to a code value corresponding to an IP address request.

11. The method as claimed in claim 9, wherein the address response message comprises an Internet Control Message Protocol (ICMP) message, and a code value of the ICMP message being set to a code value corresponding to an IP address response.

12. The method as claimed in claim 9, wherein the address request message and the address response message comprise a type field comprising type information of a corresponding message, a code field comprising information to indicate whether the corresponding message is a message for requesting the IP address usable by a portable terminal, a checksum field comprising information to check for an error of the corresponding message, and a message field comprising the MAC address of the portable terminal, if the corresponding message is the address request message, and comprising the information on the determined IP address, if the corresponding message is the address response message.

13. A portable terminal for use in a wireless communication system where an Internet Protocol (IP) address is configurable during a network entry process, the portable terminal comprising:
a means for transmitting a ranging request message to a base station when an IP subnet has been changed, the ranging request message comprising a Medium Access Control (MAC) address of the portable terminal;
a means for receiving a ranging response message comprising IP address information from the base station, usable in a new IP subnet; and
a means for configuring a new IP address from the received IP address information,
wherein the MAC address is used for determining whether the portable terminal has moved from another IP subnet,
wherein the new IP address is configured using a combination of the MAC address and a network prefix, if the MAC address does not conflict with a MAC address of another portable terminal,
wherein the new IP address is configured using a specific MAC address which is not being used in the new IP subnet, if the MAC address conflicts with the MAC address of another portable terminal, and
wherein the new IP address is used for a signal transmission and reception of the portable terminal.

14. The wireless communication system as claimed in claim 13, wherein the IP subnet is changeable due to movement of the portable terminal.

15. A base station for use in a wireless communication system where an Internet Protocol (IP) address is configurable during a network entry process, the base station comprising:
a means for receiving a ranging request message from a portable terminal, the ranging request message comprising a Medium Access Control (MAC) address of the portable terminal;
a means for determining if an IP subnet of the portable terminal is changed based on the MAC address;
a means for transmitting to a base station controller an address request message for requesting an IP address information usable by the portable terminal in a changed IP subnet, if the IP subnet of the portable terminal is changed;
a means for receiving an address response message including information on the IP address from the base station controller; and
a means for transmitting a ranging response message comprising the information on the IP address to the portable terminal,
wherein the IP address is determined using a combination of the MAC address and a network prefix, if the MAC address does not conflict with a MAC address of another portable terminal,
wherein the new IP address is determined using a specific MAC address which is not being used in the changed IP subnet, if the MAC address conflicts with the MAC address of another portable terminal, and
wherein the IP address is used for a signal transmission and reception of the portable terminal.

16. The base station as claimed in claim 15, wherein the address request message and the address response message comprise a type field comprising type information of a corresponding message, a code field comprising information to indicate whether the corresponding message is a message for requesting the IP address usable in the changed IP subnet, a checksum field comprising information to check for an error of the corresponding message, and a message field comprising the MAC address of the portable terminal, if the corresponding message is the address request message, and comprising the information on the IP address, if the corresponding message is the address response message.

17. A base station controller for use in a wireless communication system where an Internet Protocol (IP) address is configurable during a network entry process, the base station controller comprising:
a means for receiving, from a base station, an address request message for requesting an IP address usable by a portable terminal in a new IP subnet;
a means for determining the IP address usable by the portable terminal using a combination of a Medium Access Control (MAC) address and a network prefix; and
a means for transmitting an address response message comprising information on the determined IP address to the base station,
wherein the IP address is determined using a combination of the MAC address of the portable terminal and the network prefix, if the MAC address does not conflict with a MAC address of another portable terminal,
wherein the IP address usable by the portable terminal is determined using a specific MAC address which is not being used in the new IP subnet, if the MAC address conflicts with the MAC address of another portable terminal, and
wherein the IP address is used for a signal transmission and reception of the portable terminal.

18. The base station controller as claimed in claim 17, wherein the address request message and the address response message comprise a type field comprising type information of a corresponding message, a code field comprising information to indicate whether the corresponding message is a message for requesting the IP address usable in the changed IP subnet, a checksum field comprising information to check for an error of the corresponding message, and a message field comprising the MAC address of the portable terminal, if the corresponding message is the address request message, and comprising the information on the IP address, if the corresponding message is the address response message.

19. A wireless communication system for configuring an Internet Protocol (IP) address during a network entry process, the wireless communication system comprising:
  a base station for receiving a ranging request message from a portable terminal, the ranging request message comprising a Medium Access Control (MAC) address, determining if an IP subnet of the portable terminal is changed based on the MAC address, transmitting to a base station controller an address message for requesting an IP address usable by the portable terminal in a changed IP subnet, if the IP subnet of the portable terminal is changed, receiving an address response message comprising information on the IP address from the base station controller, and transmitting a ranging response message comprising the information on the IP address information to the portable terminal; and
  the base station controller for receiving the address request message from the base station, determining the IP address usable by the portable terminal in the changed IP subnet using a combination of the MAC address of the portable terminal and a network prefix, if the MAC address does not conflict with a MAC address of another portable terminal, and transmitting the address response message comprising information on the determined IP address to the base station,
  wherein the determined IP address is used for a signal transmission and reception of the portable terminal, and
  wherein the base station controller determines the IP address usable by the portable terminal in the changed IP subnet, using a specific MAC address which is not being used in the change IP subnet, if the MAC address conflicts with the MAC address of another portable terminal.

20. The wireless communication system as claimed in claim 19, wherein the base station controller is configured to:
  determine if the IP address usable by the portable terminal determined using a combination of the MAC address and the network prefix comprises a specific IP address in the wireless communication system;
  transmit the address response message without information in response to the request for an IP address to a base station, if the IP address usable by the portable terminal determined using the combination comprises the specific IP address; and
  configure a specific IP address for the portable terminal, if the IP address usable by the portable terminal determined using the combination is not the specific IP address, and transmit the address response message comprising the configured specific IP address to the base station.

21. The wireless communication system as claimed in claim 19, wherein the address request message and the address response message comprise a type field comprising type information of a corresponding message, a code field comprising information to indicate whether the corresponding message is a message for requesting the IP address usable in the changed IP subnet, a checksum field comprising information to check for an error of the corresponding message, and a message field comprising the MAC address of the portable terminal, if the corresponding message is the address request message, and comprising the information on the IP address, if the corresponding message is the address response message.

* * * * *